May 13, 1924.  
O. B. HALSTEAD  
SIGNAL  
Filed April 25, 1923  
1,493,532
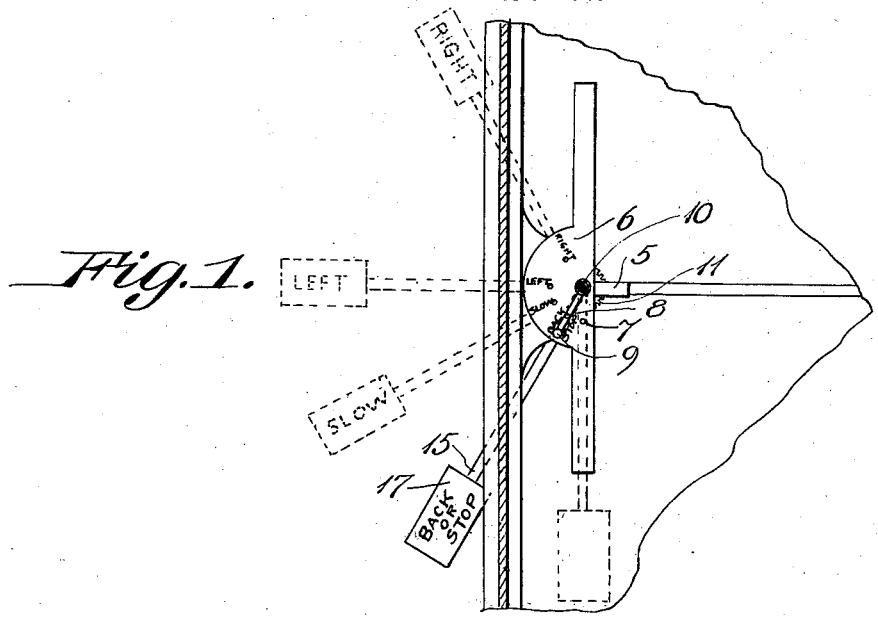
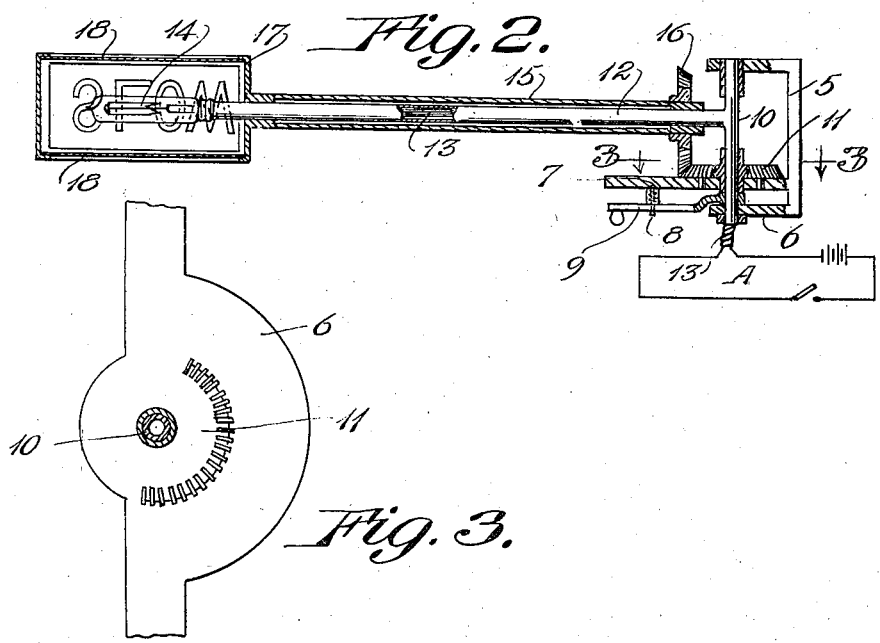

Patented May 13, 1924, 1,493,532

UNITED STATES PATENT OFFICE.

OLIVER B. HALSTEAD, OF ONTARIO, CALIFORNIA.

SIGNAL.

Application filed April 25, 1923. Serial No. 634,588.

*To all whom it may concern:*

Be it known that I, OLIVER B. HALSTEAD, a citizen of the United States of America, and resident of Ontario, in the county of San Bernardino and State of California, have invented certain new and useful Improvements in Signals, of which the following is a specification.

This invention relates to signaling devices for indicating the intended direction of travel of the user of the device when it is installed in an automobile or the like, the said invention having for an object the provision of novel means whereby a signal with legends thereon may be exhibited at the side of an automobile in order that it may be visible from the rear or from the front; and the said invention furthermore has for an object the provision of novel means for oscillatably mounting and actuating an arm carrying the signal, while at the same time the appropriate legend is displayed, according to the position of the arm.

It is a further object of this invention to produce a signaling device of the character indicated which can be mechanically operated and in which provision is made for illuminating the sign or signal when it has been properly positioned.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation of a device embodying the invention installed on a fragment of a windshield;

Figure 2 illustrates a longitudinal sectional view of the signaling mechanism; and Figure 3 illustrates a sectional view on the line 3—3 of Fig. 2 omitting the driven gear wheel.

In these drawings, 5 denotes a suitable frame that may be attached in any appropriate way to windshield frames or automobile body frames, and the inventor does not wish to be limited with respect to the manner of installing the device. The face plate 6 is segmental and has a plurality of recesses 7 in its face which serve as seats for the yieldable pin 8 that is carried by the crank 9, in order that the crank and parts which it operates may be held in the different positions of adjustment indicated by the legends on the face plate, the legends being here displayed as "Right", "Left", "Slow", "Back", "Stop".

The crank 9 is secured on a hollow shaft 10 and the shaft 10 is journaled in the frame and the said shaft also rotates in a gear wheel 11 that is stationary on the frame or face plate. Of course the toothed member 11, termed a wheel, may be in the nature of a toothed rack or other element with which a gear wheel can mesh to impart motion to the gear wheel as the arm is rotated, as will presently appear.

The hollow shaft has a hollow arm 12 connected to it that serves as a conduit for the conductors 13 for supplying current to a lamp 14 which is on the outer end of the arm. The lamp is supplied with current from a source of electricity through suitable wiring diagrammatically shown at A, and as this wiring may be changed to suit particular requirements, it need not, it is thought, be described in detail.

A sleeve 15 is rotatable on or with relation to the arm, and the said sleeve has a gear wheel 16 secured to it that meshes with the gear wheel 11, so that when the shaft 10 is rotated, the arm 12 will be oscillated carrying the sleeve which will be rotated through the engagement of the gear wheels 11 and 16. A casing 17 on the outer end of the sleeve receives the arm and lamp, and this casing is preferably provided with a series of lenses or glass panels 18 having appropriate legends thereon corresponding preferably to the legends on the face plate, and the parts are so arranged that when the crank 9 has been moved to positions indicated by the legends, a legend corresponding to that at which the crank comes to rest is displayed at the casing so that it can be read either from the front or rear of the automobile on which the device is installed. Preferably, however, the parts would be so arranged that the legend would be displayed at the rear in order that an approaching traveler may know the intended direction of travel of the user of the device.

Suitable bearings or bushings may be provided for the shaft 10, but as these are details of construction which those skilled in the art will understand, it is believed unnecessary to describe them more fully.

It will be apparent from an inspection of the drawing that the oscillation of the arm will cause the wheel 16 to travel in engagement with the wheel 11 and that the engagement of these wheels will cause the rotation of the sleeve to a greater or less extent, according to the degree of oscillation of the arm.

It is also apparent that the parts can be so proportioned and so set that when the arm has oscillated a predetermined distance, it will cause the rotation of the sleeve a predetermined degree, according to the relative diameters of the wheels 11 and 16.

I claim:

In a signal, a bracket having a shaft journaled therein, a toothed element on the bracket concentric with the shaft, an arm extending from the shaft and having a lighting fixture on its outer end, a sleeve rotatable on the arm, a toothed wheel secured to the sleeve and meshing with the toothed element on the bracket, a handle for rotating the shaft, and a lamp casing on the outer end of the sleeve enclosing the lighting fixture carried by the arm of the shaft.

OLIVER B. HALSTEAD.

Witnesses:
J. M. PAIGE,
GEORGE T. LIDDLE.